March 14, 1944.  J. J. N. VAN HAMERSVELD  2,344,187
MACHINE TOOL
Filed May 23, 1942  6 Sheets-Sheet 1

INVENTOR.
JOHN J. N. VAN HAMERSVELD.
BY
Kwis Hudson & Kent
ATTORNEYS

March 14, 1944. J. J. N. VAN HAMERSVELD 2,344,187
MACHINE TOOL
Filed May 23, 1942 6 Sheets-Sheet 2

INVENTOR.
JOHN J.N. VAN HAMERSVELD
BY
Kwis Hudson & Kent
ATTORNEYS

March 14, 1944.    J. J. N. VAN HAMERSVELD    2,344,187
MACHINE TOOL
Filed May 23, 1942    6 Sheets-Sheet 5

INVENTOR.
JOHN J. N. VAN HAMERSVELD
BY
Kwis Hudson & Kent
ATTORNEYS

Patented Mar. 14, 1944

2,344,187

UNITED STATES PATENT OFFICE 2,344,187

MACHINE TOOL

John J. N. Van Hamersveld, Cleveland Heights, Ohio, assignor to The Warner & Swasey Company, Cleveland, Ohio, a corporation of Ohio Application May 23, 1942, Serial No. 444,251

29 Claims. (Cl. 29—64)

This invention relates to a machine tool and particularly to mechanism for selecting or preselecting the rates of movement of a movable part or parts of the machine and for effecting a change of the rates of movement thereof to the selected or preselected rates.

Inasmuch as the selecting or preselecting mechanism embodying the invention has particular utility when applied to non-rotating movable members of a machine tool, such as a cross slide carriage and cross slide or a turret slide, for controlling the rates of feeding movements of such members, it is so illustrated and described herein.

An object of the invention is to provide a mechanism for selecting or preselecting and obtaining the different rates of feeding movement of a non-rotatable movable part of a machine tool such as a slide and wherein upon movement of a control lever substantially at the end of each operative step in the work cycle the selecting or preselecting means is automatically power indexed to select or preselect the rate of movement for the next succeeding operative step in the work cycle.

Another object is to provide in a machine tool mechanism for selecting or preselecting and obtaining the different rates of feeding movement of a slide and which mechanism may be controlled solely and entirely by a single control lever.

Another object is to provide mechanism for selecting or preselecting and obtaining the different rates of feeding movement of a machine tool slide and wherein movement of the feed control lever in a releasing direction effects an automatic indexing movement of said mechanism, while movement of said lever in the opposite direction actuates said mechanism to obtain the selected or preselected rate of movement.

Another object is to provide in a machine tool mechanism for effecting different rates of feeding movement for a slide and wherein is employed indexible means operatively connected with the feed control lever such that when said lever is moved in a clutch disengaging direction at the end of one operative step in the work cycle said means is power indexed automatically and substantially simultaneously with the disengagement of the clutch to preselect a new feeding rate for the slide for the following operative step in the work cycle.

Another object of the invention is to provide a mechanism for controlling the rates of feeding movement of a slide of a machine tool and wherein the selection or preselection of the different rates and the obtainance thereof are effected entirely by the movements of the feed control lever.

Another object is to provide a mechanism for controlling the rates of feeding movement of a slide of a machine tool and which includes a clutch and change speed elements and wherein the shifting of said elements is controlled and effectuated entirely by the control elements for said clutch.

A still further object is to provide a mechanism for obtaining the different rates of feeding movement for a slide of a machine tool and which mechanism is preset in accordance with the different rates of movement desired for the different operative steps of a complete work cycle, after which and during the operation of the machine tool movement of a single lever controls and effectuates the obtainance of said different rates of movement.

Further and additional objects and advantages not hereinbefore specified will become apparent or be pointed out during the detailed description which is to follow of several embodiments of the invention.

Referring to the accompanying drawings,

Fig. 10 is a vertical sectional view taken along line 10—10 of Fig. 5, looking in the direction of the arrows.

Fig. 11 is a view similar to Fig. 10, but showing the parts in different operative relationship.

Fig. 12 is a sectional view taken along line

12—12 of Fig. 10, looking in the direction of the arrows, and on a larger scale than Fig. 10.

Fig. 13 is a detached partly sectional view of a portion of Fig. 10 and on a larger scale and is taken substantially along line 13—13 of Fig. 12, looking in the direction of the arrows.

Fig. 14 is a view similar to Fig. 13 but showing the parts in different relationship.

Figure 1:
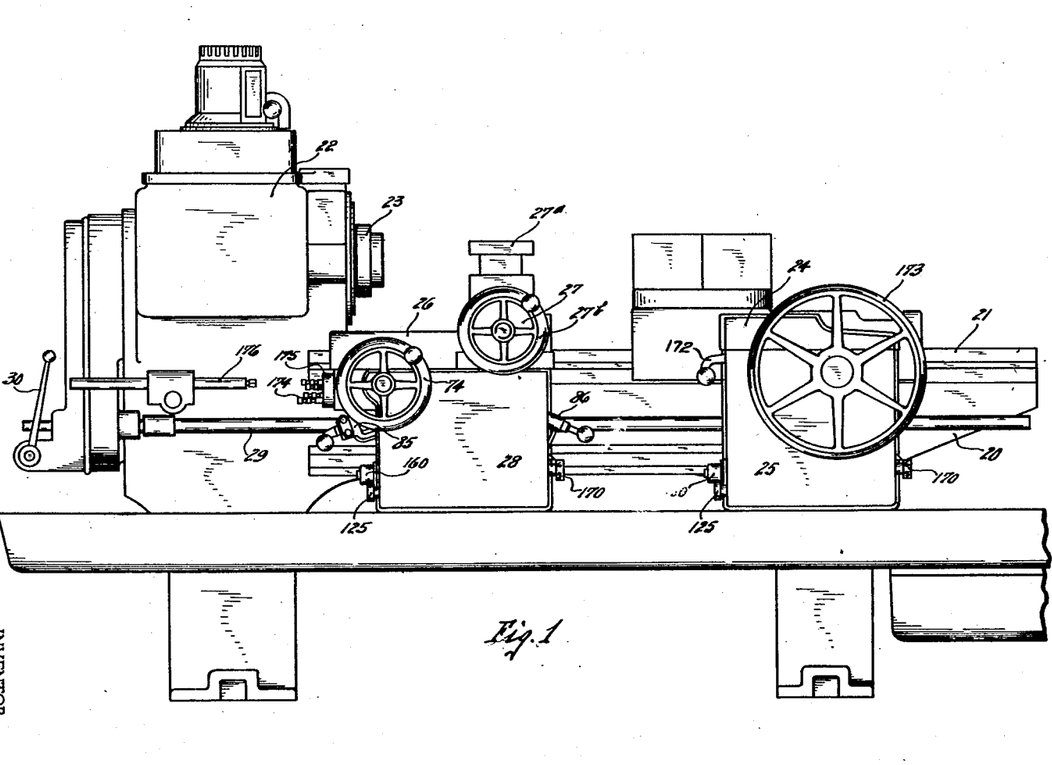
Fig. 1 is a front elevational view of a machine tool embodying the invention and for purposes of illustration the machine tool shown is a turret lathe.

Referring to Fig. 1, the invention is shown by way of illustration as applied to a turret lathe and which lathe comprises a bed 20 provided with longitudinally extending ways 21 and having at one end a head 22. The usual work or tool spindle 23 is mounted in the head and can be driven at a plurality of different speeds from a power source by suitable change speed gearing arranged in the head but not illustrated as it is well understood in the art. A turret slide 24 is mounted on the ways 21 of the bed for movement longitudinally thereof and is provided on its front side with an apron 25. Intermediate the turret slide 24 and the head 22 is slidably mounted on the ways 21 a cross slide carriage 26 that has a cross slide 27 and is provided on its front side with an apron 28. The cross slide 27 may carry a square turret 27a. The turret slide 24, cross slide carriage 26 and cross slide 27 are moved for purposes of feeding by means of a power driven feed shaft 29 that extends longitudinally of the front of the bed 20 and is operatively connected at its left hand end, as viewed in the drawings, through suitable gearing with the work spindle 23, as is well understood in the art. The operative connection between the shaft 29 and the work spindle 23 includes shiftable gear elements and a control lever 30 for said elements, such that a high speed rotation or a low speed rotation can be imparted to the feed shaft 29 as desired, all as is well known in the art. The feed shaft 29 is operatively connected with the turret slide 24, the cross slide carriage 26 and the cross slide 27 by means of suitable drive trains mounted in the turret slide apron 25 and in the cross slide carriage apron 28 and which will later be explained more in detail.

Figure 5:
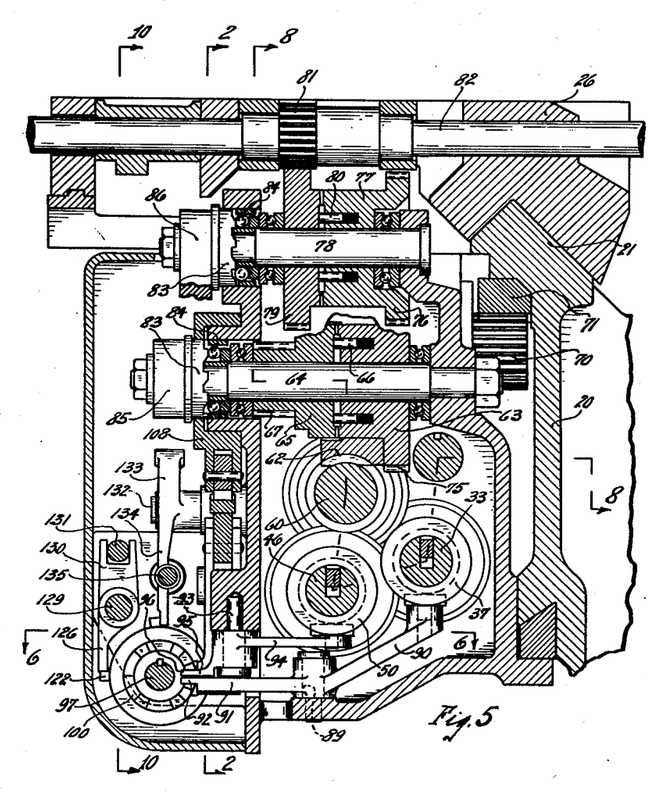
Fig. 5 is a transverse sectional view through the cross slide, cross slide carriage and apron and is taken substantially on irregular line 5—5 of Fig. 2, looking in the direction of the arrows.
Figures 8, 9:
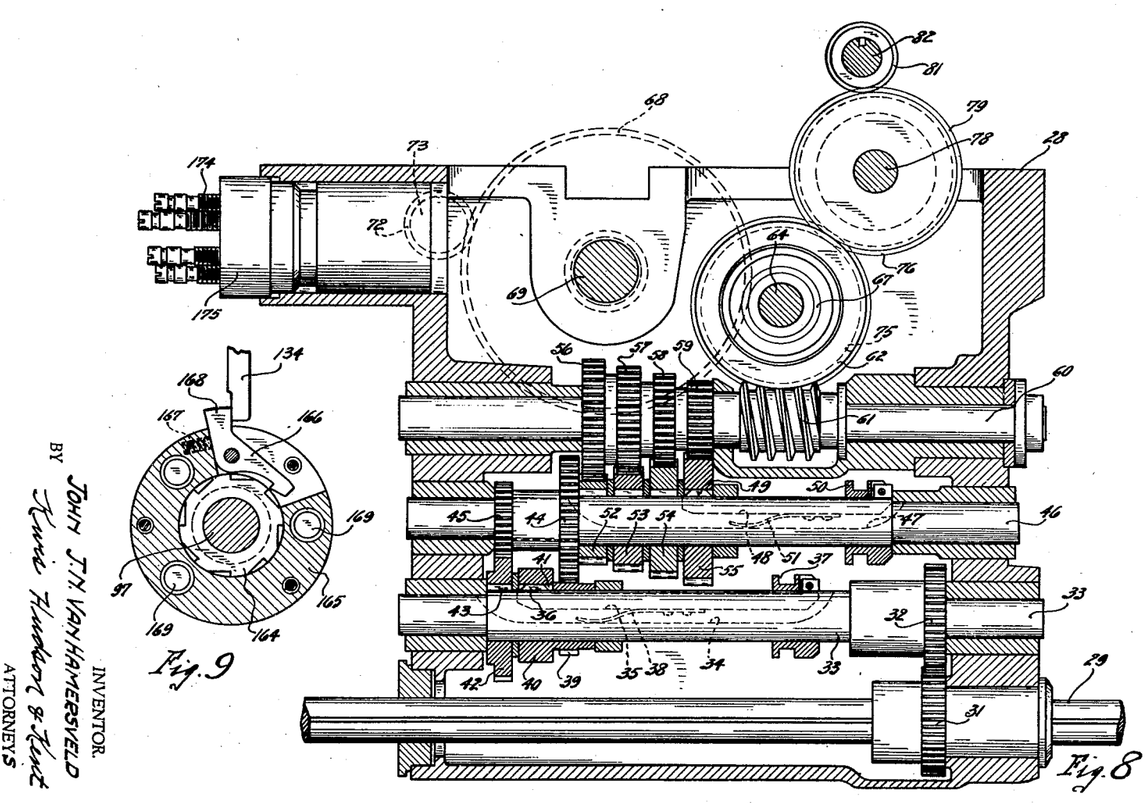
Fig. 8 is a developed sectional view taken substantially on irregular line 8—8 of Fig. 5, looking in the direction of the arrows.
Fig. 9 is a vertical sectional view taken substantially on line 9—9 of Fig. 2, looking in the direction of the arrows.

Inasmuch as the drive train in the turret slide apron 25 and which operatively connects the turret slide with the feed shaft 29 is a substantial duplicate of the drive train in the apron 28 of the cross slide carriage 26 when the power drive for the cross slide is omitted, it will only be necessary to explain herein in detail the drive train in the cross slide carriage apron 28, and for this purpose reference may be had particularly to Figs. 5 and 8, which latter figure is a developed sectional view.

The feed shaft 29 has a splined connection with a rotatable gear sleeve mounted against endwise movement in the apron 28, as is well known in the art, and carrying a gear 31 which meshes with a gear 32 formed on a sleeve that is fixed to a shaft 33 rotatably mounted in suitable bearings in the apron 28. The shaft 33 is provided with a longitudinally extending slot 34 in which is slidably and rockably mounted a finger 35 that is provided at one of its ends with an oppositely tapered key portion 36, while its opposite end is pivotally connected to a collar 37 that is slidable on the shaft 33. A spring 38 is secured to the under side of the finger 35 and bears against the bottom of the slot 34 and acts to urge the key portion 36 in a direction radially outwardly of the shaft 33. A gear 39 is formed on a sleeve having a collar 40 and which sleeve is mounted on the shaft 33 for free rotation thereon but is held against endwise movement by suitable means as will be well understood. The collar 40 is provided with a keyway 41 into which the key portion 36 of the finger 35 is adapted to project to operatively interconnect the sleeve having the collar 40 and gear 39 with the shaft 33 so that they will rotate with the latter. A gear 42 larger than the gear 39 is rotatably mounted on the shaft 33 but held against endwise movement thereon by suitable means and this gear is provided with a keyway 43 also adapted to receive the key portion 36 of the finger 35 so that the gear 42 can be operatively connected to the shaft 33 to rotate therewith as a unit.

It will be understood that when the collar 37 is shifted axially of the shaft 33 the finger 35 will also be moved longitudinally of the slot 34 to cause the key portion 36 to be selectively engaged with either the keyway 41 of the collar 40 or with the keyway 43 of the gear 42 as the case may be to effect a rotation of either the gear 39 or the gear 42 with the shaft 33.

The gears 39 and 42 are constantly intermeshed, respectively, with gears 44 and 45 formed on a sleeve that is fixed to a shaft 46 rotatably supported in suitable bearings located in the apron 28 of the cross slide carriage. It will be seen that the shaft 46, through the gear 39 or the gear 42, can be connected with the feed shaft 29 so as to have two different speeds of rotation.

The shaft 46 is provided with a longitudinally extending slot 47 similar to the slot 34 in the shaft 33 and in this slot 47 there is slidably mounted a finger 48 like the finger 35, and said finger 48 is provided at one of its ends with an oppositely tapered key portion 49, while its opposite end is pivotally connected to a collar 50 that is slidably mounted on the shaft 46. A spring 51 secured to the finger 48 and located in the slot 47 acts to urge the key portion 49 outwardly in a radial direction with respect to the shaft 46 and into engagement with a keyway formed in each of four gears 52, 53, 54 and 55 rotatably mounted on the shaft 46 but held against endwise movement by suitable means as will be well understood.

It will also be understood that the finger 48 and the key portion 49 can be shifted by the movement of the collar 50 to selectively engage said key portion in one or another of the keyways in the aforementioned four gears so that one or the other of the gears 52, 53, 54 and 55 will be operatively connected to the shaft 46 to rotate therewith as a unit.

The gears 52, 53, 54 and 55 are constantly intermeshed, respectively, with gears 56, 57, 58 and 59 fixed on a shaft 60 that is rotatably supported in suitable bearings in the apron 28. The shaft 60 has fixed thereon a worm 61 which meshes with a worm wheel 62. The worm wheel 62 is either fixed to or made a part of a sleeve 63 that is freely rotatable on a shaft 64 that is arranged transversely of the shaft 60 and extends from the rear to the front of the apron 28, see Fig. 5. A sleeve 65 is also freely rotatable on the shaft 64 and can move endwise thereof and this sleeve 65 and the sleeve 63 on their adjacent faces are provided with serrations or clutch teeth which act to clutch the sleeve 63 to the sleeve 65 when the two sleeves are brought together. Spring-pressed plungers 66 are mounted in the sleeve 63 and engage with the adjacent face of the sleeve 65 and tend to maintain said sleeves in a separated or clutch disengaged condition.

The sleeve 65 has formed thereon a gear 67 which is always intermeshed with a large gear 68 fixed on a shaft 69 (see Fig. 8) mounted in the apron 28 and extending parallel to the shaft 64 and this shaft 69 at its rear end and outwardly of the apron is provided with a pinion 70 in mesh with a rack 71 fixed to the bed 20 (see Fig. 5), wherefore it will be seen that when the shaft 69 and the pinion 70 are rotated the cross slide carriage 26 will have movement imparted thereto longitudinally of the ways 21 of the bed.

The gear 68 is also in mesh with a pinion 72 fixed on a shaft 73 (see Fig. 8) arranged parallel to the shaft 69 and projecting outwardly of the front of the cross slide carriage and having fixed thereto a hand wheel 74 as is well known in the art.

The sleeve 63 has formed thereon a gear 75 that meshes with a gear 76 formed on a sleeve 77 freely rotatable on a shaft 78 supported in the apron 28. A gear 79 is freely rotatable on the shaft 78 and can have endwise movement thereon. The adjacent faces of the sleeve 77 and gear 79 are provided with serrations forming clutch teeth, whereby the gear 79 can be operatively clutched to the sleeve 77. The sleeve 77 is provided with spring pressed plungers 80 acting to normally maintain the adjacent faces of the sleeve 77 and gear 79 separated and the clutch teeth disengaged. The gear 79 is meshed with a wide faced gear 81 formed as part of a sleeve that is splined on the screw shaft 82 which has operative connection with the cross slide as is well known in the art to impart linear movement thereto. The shaft 82 extends beyond the front of the cross slide 27 and has fixed thereto a hand wheel 27b for manually rotating the shaft and moving the cross slide.

The sleeve 65 on the shaft 64 and the gear 79 on the shaft 78 are cammed into clutching engagement with the sleeves 63 and 77, respectively, by means of rockable cam members 83 operating against end thrust bearing balls 84. These cam members are rocked by feed control levers 85 and 86, the former of which controls the engagement and disengagement of the sleeves 63 and 65 to control the longitudinal power feeding movement of the cross slide carriage while the lever 86 controls the engagement and disengagement of the sleeve 77 and gear 79 to control, in turn, the imparting of the power feeding movements to the cross slide.

Figures 2, 3, 4:
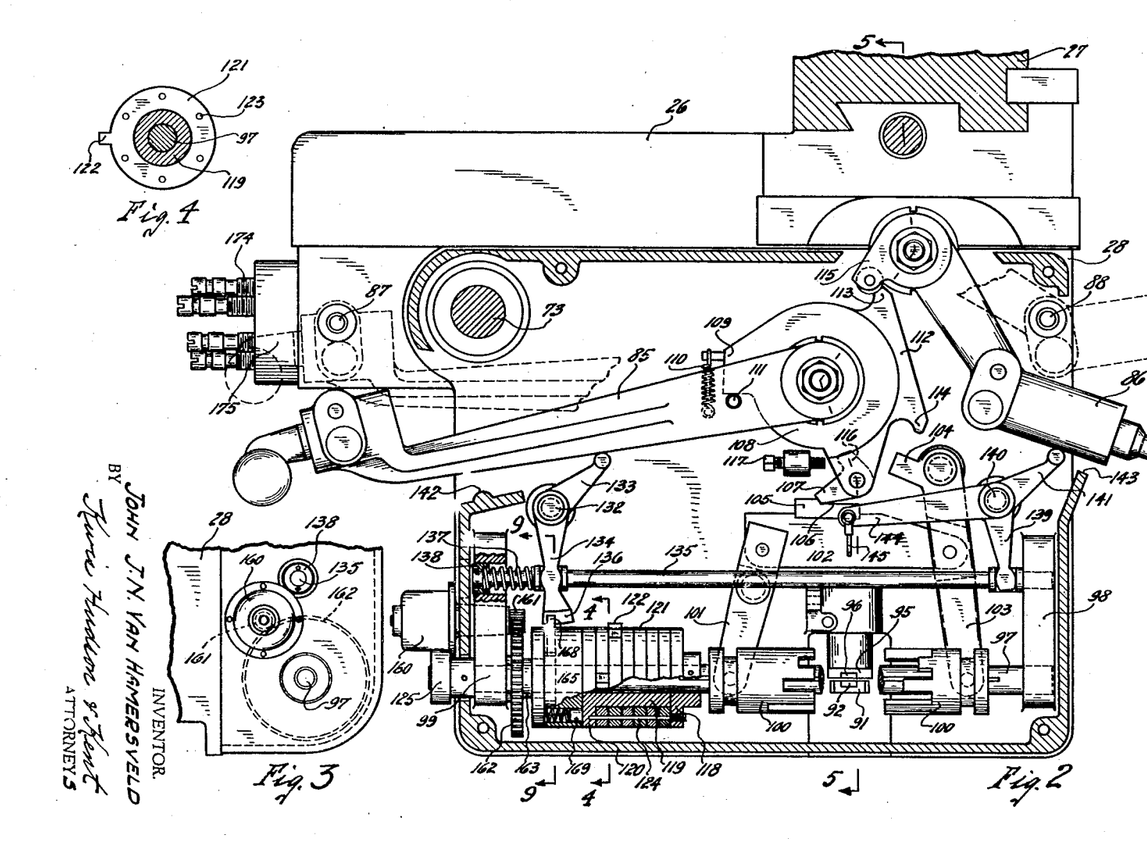
Fig. 2 is a vertical sectional view, on a larger scale than Fig. 1, through the apron of the cross slide carriage and the cross slide and is taken substantially on line 2—2 of Fig. 5, looking in the direction of the arrows.
Fig. 3 is a fragmentary end elevational view taken looking at the lower left hand corner of Fig. 2.
Fig. 4 is a detail sectional view taken substantially on line 4—4 of Fig. 2, looking in the direction of the arrows.

When the lever 85 is moved from the full line position of Fig. 2 to the dash line position thereof the sleeves 63 and 65 are engaged and longitudinal power feeding movement is being imparted to the cross slide carriage. When the lever 86 is moved from the full line position to the dash line position of Fig. 2 the clutch teeth on the sleeve 77 and gear 79 are engaged and power feeding movement is being imparted to the cross slide.

The feed control levers 85 and 86 are held in their dash line position of Fig. 2, i. e., the latch engaged or power feeding position, by means of spring latches under the control of the rockable handle portions of the levers, as is well understood in the art, and comprising spring pressed pins carried by the levers, and which engage, respectively, in recesses or openings 87 and 88 in the apron.

It will be understood that power feeding movement of the cross slide carriage or of the cross slide is initiated by manually moving the lever 85 or the lever 86 from full line position to the dash line position of Fig. 2 and that such feeding movements can be terminated by disengaging the pins carried by the levers from the openings 87 and 88, either automatically or manually, to allow the levers 85 and 86 to drop by gravity to the full line position of Fig. 2.

It has already been explained that in this instance eight different rates of power feeding movement can be imparted to either the cross slide carriage or the cross slide from the feed shaft 29 through the gearing in the apron and that these different rates of feeding movement can be selectively obtained by shifting the collars 37 and 50 to cause certain of the gears to be operatively coupled to the shafts upon which they are mounted.

The collar 37 on the shaft 33 is shifted by means of a two arm shifting lever pivoted in the apron at 89 with the arm 90 of the lever carrying at its free end a shoe located in the annular groove of the collar 37, see Figs. 2 and 5, while the arm 91 of this lever is provided at its free end with a finger portion 92 which will be referred to hereinafter.

The collar 50 on the shaft 46 is shifted by means of a shifting lever pivotally supported in the apron at 93 and having a long arm 94 that is provided at its free end with a shoe located in the annular groove formed in the collar 50. This lever is provided with a short arm 95 having a finger portion 96 similar to the finger portion 92 on the arm 91 of the first mentioned lever; it being noted that the finger portions 96 and 92 lie closely adjacent to each other for a purpose later to become apparent.

It will be noted that rocking movements imparted to the shifting levers will result in endwise movement of the collars 37 and 50 on the shafts 33 and 46, and it will further be noted that the lever arms 90 and 91 of the first mentioned shifting lever are of substantially equal length, wherefore any movement imparted to the finger portion 92 of said lever will result in substantially the same amplitude of movement being imparted to the collar 37, wherefore the key portion 36 of the finger 35 can be moved sufficiently far to connect or key the gear 39 or the gear 42 to the shaft 33.

On the other hand, it will be noted that the lever arm 94 of the second mentioned shifting lever is substantially longer than the arm 95 and finger portion 96 of said lever, wherefore movement imparted to the finger portion 96 will result in moving the collar 50 a greater distance than the collar 37 in order that the key portion 49 of the finger 48 can act to key one or the other of the four gears 52, 53, 54 and 55 to the shaft 46.

The finger portions 92 and 96 of the shifting levers are shifted by the mechanism now to be described and which mechanism serves to select or preselect the different rates of feeding movement to be imparted to the cross slide carriage and/or the cross slide.

It will also be pointed out that said mechanism is operatively connected with the feed control levers 85 and 86 in such manner that the movement of said control levers not only initiates and terminates the feeding movements of the cross slide carriage and the cross slide, but also effects the actuation of the selecting or preselecting mechanism to obtain the different rates of feeding movement.

Figure 6:
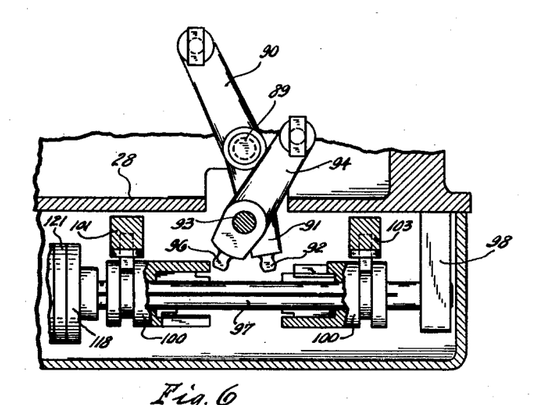
Fig. 6 is a horizontal sectional view taken substantially on line 6—6 of Fig. 5, looking in the direction of the arrows.
Figure 7:
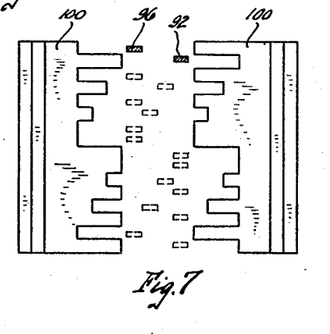
Fig. 7 is a detached developed view of the indexible members of the selecting and preselecting mechanism.

A shaft 97 is rotatably supported in suitable bearings formed in spaced bearing lugs 98 and 99 extending outwardly from the front of the apron. Splined on the shaft 97 for rotation therewith and endwise movement thereon are two similar spools 100 which on their adjacent faces are provided with cooperating projections arranged in series of long and short and short and long projections. The finger portions 92 and 96 of the two shifting levers previously referred to are located between the series of projections, see particularly the developed view of Fig. 7 and also Figs. 2 and 6.

The spools 100 are moved endwise on the shaft 97 toward and away from each other with an equalized movement by mechanism now to be explained.

The left hand spool 100, as viewed in Fig. 2, receives in the annular groove formed therein the pivoted shoe carried by the lower end of a rockable lever 101 which is pivoted intermediate its ends in the apron. The upper end of the lever 101 is pivotally connected to a link 102. The right hand spool 100, as viewed in Fig. 2, receives in the annular groove therein the pivoted shoe carried by the lower end of a longer lever 103, the upper end of which is pivotally supported in the apron. The lever 103 intermediate its lower end and its point of pivotal attachment to the apron is pivotally connected to the link 102. The lever 103 adjacent its point of pivotal attachment to the apron is provided with a short angularly disposed arm 104 for a purpose later to be explained.

It will be seen that if endwise movement is imparted to the link 102 the levers 101 and 103 will be rocked thereby and cause equalized endwise movement of the spools 100 toward and away from each other. The link 102 is provided on its upper side with an actuating block 105 that has its upper edge recessed or cut away, as indicated at 106, to form an inclined shoulder that cooperates with a pivoted pawl 107 for a purpose later to be explained.

When the feed control levers 85 and 86 are in the full line positions of Fig. 2, i. e., clutch disengaged position, the spools 100 are in their most outward or indexing positions. The pivoted pawl 107 is carried in a forked portion of a rockable member 108 that is mounted on a boss formed on the front face of the apron and which member surrounds the cam member 83 that is operatively associated with the lever 85. The member 108 is provided on its circumference with a radially extending lug 109 which has a flat lower abutting surface and carries a laterally extending pin to which one end of a spring 110 is connected, the opposite end of said spring being connected to a fixed pin carried by the apron. The spring 110 acts to maintain the flat abutting lower surface of the lug 109 in engagement with a pin 111 carried by the lever 85.

It will be seen that the member 108 will be rocked in a clockwise direction together with an upward movement of the lever 85 or that it can be rocked in said direction independently of any such movement of the lever 85 for a purpose later to be pointed out. The member 108 is provided with an outwardly extending lug 112 having at its opposite ends shoulders 113 and 114.

The shoulder 113 cooperates with a roller mounted in a short arm 115 forming part of the feed control lever 86, wherefore it will be seen that upward movement of said lever 86 will act to rock the member 108 in a clockwise direction independently of any movement of the feed control lever 85.

The pawl 107 previously referred to is pivotally carried by the member 108 and held by gravity in the position shown in Fig 2 and clockwise rocking movement of said member results first in said pawl moving the link 102 toward the left, as viewed in Fig 2, to rock the levers 101 and 103 and move the spools 100 toward each other with an equalized movement to actuate the arms 91 and 95 of the gear shifting levers.

When the spools 100 have been moved toward each other to their most inward positions the angularly disposed arm 116 of the pawl 107 contacts the end of an adjustable abutting screw 117 mounted in a lug formed in the apron and said pawl is rocked out of engagement with the inclined surface 106 of the block 105. In this connection, see Fig. 15, wherein the pawl is shown in this disengaged position. Simultaneously with the disengagement of the pawl 107 from the block 105 the shoulder 114 of the lug 112 of the member 108 engages the short arm 104 of the lever 103, and the continued clockwise rocking movement of the member 108 rocks said lever 103, moves the link 102 toward the right and rocks the lever 101 to effect outward endwise equalized movement of said spools away from each other to bring the spools to their former or indexing position, that is, in a position wherein the projections are free of the pins 92 and 96 carried by the shifting levers (see Fig. 15).

It will be seen that when either the feed control lever 85 or the feed control lever 86 is moved from its full line position of Fig. 2 to its dash line position thereof to engage either the clutch for the drive to the cross slide carriage or the clutch for the drive to the cross slide, the spools 100 are first moved inwardly to effect a shifting of the gearing in said drive train and are then moved outwardly to their original position in which they are held so long as one or the other of the levers 85 or 86 remains engaged in feeding position. When one or the other of said levers is in feeding position, i. e., clutch engaged position, the spools 100 are always held in position to be indexed, thus permitting the rate of feeding movement for the cross slide carriage or the cross slide to be preselected for the next operative step during the feeding movement thereof at the old rate of movement.

When either the lever 85 or the lever 86 is disengaged from its feeding position, i. e., its dash line position of Fig. 2, and returns to its full line or clutch disengaged position, such movement of either of said levers is independent of any movement of the member 108, although the latter member is restored at this time to the position shown in Fig. 2 by the action of the spring 110.

It will be understood, however, that should both the feed control levers 85 and 86 be in clutch engaged or feeding position in order to simultaneously feed the carriage and cross slide, the member 108 will not return to the position indicated in Fig. 2 until both levers have been disengaged and return to their full line positions.

The return of the member 108 to the position shown in Fig. 2 causes the pawl 107 to resume its engagement with the inclined surface of the block 105 and moves the shoulder 114 away from the short arm 104 of the lever 103. In other words, the member 108 and the parts associated therewith are restored to their original position and one wherein subsequent clockwise movement of the member 108 will result in first moving the spools 100 toward each other, and then away from each other as previously explained.

The mechanism for indexing the spools 100 to bring different sets of projections into cooperating relationship with each other to select or preselect the different rates of feeding movement for the cross slide carriage and the cross slide will now be explained.

A flanged sleeve 118 is fixed to the shaft 97 and is fixedly connected to one end of an elongated sleeve 119 also mounted on the shaft 97 and provided at its opposite end with a flange 120. The elongated sleeve 119 supports intermediate the flange of the sleeve 118 and the flange 120 a plurality of disks 121, six of which are shown in the present instance, since it is assumed that there are six operative steps in the complete work cycle. Each disk 121 is provided with a radially extending lug 122 on its circumference and with a plurality of circumferentially spaced openings 123 (see Fig. 4). The disks 121 are set up or located in predetermined relationship on the sleeve 119 so that the lugs 122 thereof are positioned in correlation to the different indexed positions of the spools 100, which latter positions are correlated to the different rates of feeding movement. The disks 121 are held in located position by means of a screw pin 124 passing through the flange of the sleeve 118, through certain of the openings 123 of the disks and into the flange 120, wherefore the disks in their adjusted positions and the sleeves 118 and 119 and their flanges rotate with the shaft 97 and spools 100 as a unit.

The shaft 97 is provided on its left hand end, as viewed in the drawings, with a knob 125 for the purpose of manually rotating the shaft during the locating of the disks 121 in their proper positions or to adjust the positions of the disks 121 in accordance with different indexed positions of the spools 100 for different rates of feeding movement for the cross slide carriage and the cross slide. In the normal operation of the machine the shaft 97 is rotated or indexed by power as will later be explained.

The lugs 122 of the disks 121 are adapted to contact successively an abutment arm 126 when the shaft 97 is rotated, and such contact of the lugs with the abutment arm arrests further rotation of the shaft and locates the spools 100 in their proper indexed position. The abutment arm 126 is formed on an interiorly threaded sleeve 127 which is mounted on and engaged with a threaded portion 128 of a shaft 129 that is rotatably supported in the bearing lugs 98 and 99. The sleeve 127 is provided with an upstanding arm 130, the upper end of which is forked and straddles a rod 131 slidably supported also in the lugs 98 and 99. It will be seen that since the sleeve 127 is held against rotation by the engagement of the forked portion of the arm 130 with the rod 131 that rotation of the shaft 129 and the threaded portion 128 thereof will cause said sleeve to move endwise and in a direction depending upon the direction of rotation of the shaft and threaded portion, thus moving the abutment arm 126 linearly between the flange 120 and the flange of the sleeve 118.

In order to impart a step by step movement in one direction to the shaft 129 and the threaded portion 128 thereof so as to move the sleeve 127 and the abutment arm 126 step by step to successively position said arm in the path of the lugs 122 of each of the disks 121 the following mechanism is employed. A two armed lever is pivoted in the apron at 132 and has its upper and shorter arm 133 provided at its free end with a rounded portion upon which the feed control lever 85 rests when the latter is in the full line or clutch disengaged position of Fig. 2. This two armed lever has its lower and longer arm 134 extending downwardly and provided with a rounded portion intermediate its ends located in a slot formed in an endwise movable bar 135 slidably supported by the lugs 98 and 99. The lower end of the arm 134 is provided with a holding portion 136 for a purpose later to be referred to. A coil spring 137 surrounds the bar 135 between the slotted portion thereof and a recessed adjusting screw 138 mounted in a threaded opening in the lug 99, wherefore the tension of the spring 137 can be varied. The bar 135 is provided with a second slotted portion which receives the rounded lower end of the arm 139 of a three armed lever pivoted at 140 in the apron. The three armed lever has another arm 141 provided at its free end with a rounded portion upon which the feed control lever 86 rests when the latter is in the full line or clutch disengaged position of Fig. 2.

It will be seen that if either the feed control lever 85 or the feed control lever 86, when in the full line or clutch disengaged position of Fig. 2, is moved additionally in a downward direction to bring it into contact with the stop surface 142 or the stop surface 143 formed on the cover of the apron, that movement will be imparted to the bar 135 toward the left and against the pressure of the spring 137. Since the tension of the spring 137 is adjustable it will be understood that said spring may function in either of two ways. The tension of the spring may be sufficiently great to support the levers 85 and 86 in their full line or clutch disengaged position of Fig. 2 and to cushion the blow incident to the dropping out of said levers from clutch engaged position at the end of the feeding movements of either the cross slide carriage or the cross slide. In this instance, a further manual downward movement of either of the levers will be required to bring the same into engagement with the stop surface 142 or 143 as the case may be and during which additional movement the spring 137 is compressed and the bar 135 shifted endwise toward the left. In this instance also the spring 137 will restore the levers 85 and 86 to their full line position when pressure on the levers is released. On the other hand the tension of the spring 137 may be so adjusted that the weight of the levers 85 and 86 in falling out of clutch engaged position and into clutch disengaged position will compress the spring 137 until the levers engage the stop surface 142 or 143 and, of course, this will effect endwise movement of the bar 135. In the case just referred to there will be required no additional manual movement of the feed control levers 85 and 86 in a downward direction. Also in this latter mentioned case when the feed control levers are raised manually to clutch engaged position the strength of the spring 137 will be sufficient to restore the bar 135 to its original position and to rock the lever arms 134 and 139 to their original position as indicated in Fig. 2.

When the three armed lever pivoted at 140 is rocked in a clockwise direction either directly by the feed control lever 86 or by the movement of the rod 135 occasioned by the movement of the feed control lever 85, the third arm 144 of said lever raises a link 145, the upper end of which link is pivotally connected to the free end of the arm 144. The lower end of the link 145 is pivotally connected to a shouldered pin carried by the flange 146 formed on a sleeve 147 that is freely rockable on the shaft 129. Consequently upward movement of the arm 144 and link 145 produces an anticlockwise movement of the flange 146 and sleeve 147. The flange 146 pivotally supports an actuating pawl 148 which is constantly urged by a spring 149 into engagement with the teeth of a ratchet 150 which is fixed to the shaft 129. A retaining pawl 151 is pivotally mounted on a support within the apron and lies in the same plane as the pawl 148 and also engages with the teeth of the ratchet 150 to prevent reverse movement thereof. The pawl 151 is urged into engagement with the ratchet by the spring 152. The pawls 148 and 151 are provided on their left sides with beveled portions for a purpose later to become clear (see Figs. 13 and 14). A rat trap spring 153 is mounted on a sleeve 154 fixed to the shaft 129 and said spring has one end connected to the sleeve and its opposite end to the bracket 98 and tends to rotate the shaft 129 in a clockwise direction as viewed in Fig. 12, and such rotation is prevented by the retaining pawl 151.

Figures 10, 11, 12, 13, 14:
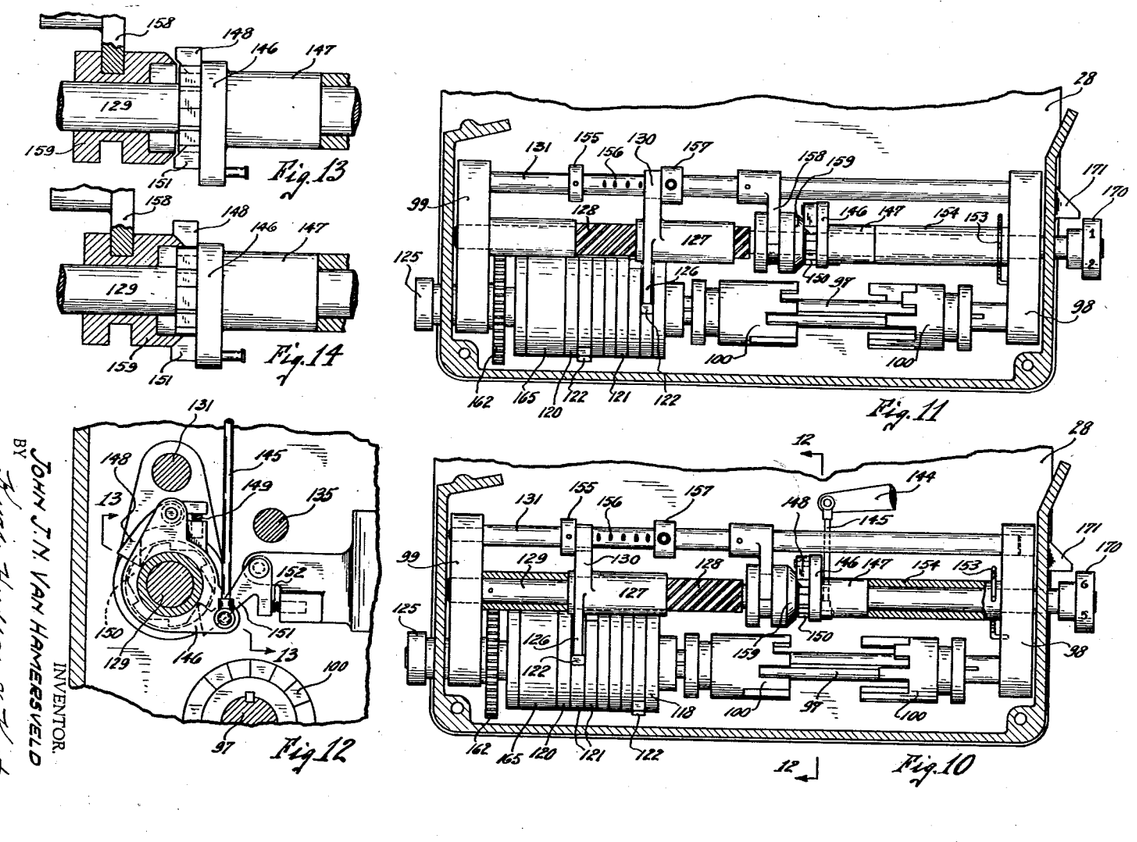

From the foregoing it will be seen that each time the flange 146 is rocked in an anticlockwise direction, as viewed in Fig. 12, the actuating pawl 148 and the shaft 129 will be rotated in an anticlockwise direction one-sixth of a complete revolution, since the ratchet 150 is provided with six equally spaced teeth in the present instance, the retaining pawl 151 acting after each such rotation of the ratchet 150 to hold said ratchet and shaft in their rotated position and against reverse or clockwise rotation by the rat trap spring 153.

It will be understood that when the flange 146 is rocked in a clockwise direction as the arm 144 of the three armed lever is restored to the position of Fig. 2, the pawl 148 merely idles over the teeth of the ratchet 150 and produces no movement therein and said pawl 148 will be positioned in engagement with the next tooth of the ratchet ready to impart anticlockwise movement thereto.

The rotation of the shaft 129 through one-sixth of a complete revolution causes the threaded portion 128 thereof to move the sleeve 127, its abutment arm 126 and its arm 130 a predetermined distance toward the right as viewed in Fig. 10 and which distance is equal to the width of each disk 121. Therefore provision is made to move the abutment arm 126 step by step from left to right to overlie successively each of the disks 121 and lie in the path of the lug 122 of each respective disk.

As previously stated, the arm 130 of the sleeve straddles the rod 131 and when the sleeve is in its most left hand position will abut a collar 155 fixed to the rod. The rod is provided to the right of the fixed collar 155 with a series of depressions 156 equally spaced longitudinally of the rod. An adjustable collar 157 is mounted on the rod 131 and carries a set screw which co-operates with any one of the depressions 156 to enable the collar 157 to be secured in adjusted position on the rod a predetermined number of depressions to the right of the fixed collar 155, depending upon the number of operative steps in a complete work cycle of the machine, which, in this instance, contemplates six such operative steps.

In Fig. 10 the arm 130 of the sleeve 127 is shown in the position it occupies for the first operative step in the work cycle, at which time it is in engagement with the fixed collar 155, while in Fig. 11 said arm is in the position it occupies during the sixth operative step of the work cycle, at which time it is in contact with the adjustable collar 157.

When the sleeve 127 has been moved step by step toward the right in the manner just referred to to successively position the abutment arm 126 over each disk 121 the arm 130 of the sleeve contacts the adjustable collar 157. The next upward movement of the arm 144 of the three armed lever, and consequent anticlockwise movement of the flange 146 and shaft 129, causes the sleeve 127 and arm 130 to move to a theoretical seventh position and said arm 130 therefore shifts the collar 157 and the rod 131 toward the right.

The rod 131 has fixed thereto a sleeve provided with a fork 158 which straddles the annular groove of a pawl releasing cone 159 which is slidable and freely rotatable on the shaft 129. The pawl releasing cone 159 has a conical right hand end as viewed in the drawings and this end of the cone when the latter moves from the position shown in Fig. 13 into the position shown in Fig. 14 engages the beveled portions of the pawls 148 and 151 and rocks the same simultaneously radially outwardly against the action of their springs and out of engagement with the teeth of the ratchet 150, whereupon the rat trap spring 153 which has been wound up by the step by step anticlockwise rotation of the shaft 129 rotates said shaft in a clockwise direction, with a resultant left hand endwise movement of the sleeve 127 from the right of the position shown in Fig. 11 to the position shown in Fig. 10, at which time the abutment arm 126 overlies the most left hand or first of the disks 121 and is in position to repeat the cycle of operations. The movement of the sleeve 127 toward the left as just referred to also causes the arm 130 to strike the fixed collar 155, shift the rod 131 toward the left and move the pawl releasing cone 159 from the position shown in Fig. 14 to the position shown in Fig. 13, at which time the actuating pawl 148 and the retaining pawl 151 are again rendered active under their springs and again engage with the teeth of the ratchet 150.

It will be understood that suitable spring points may be provided for retaining the rod 131 in either one of its two shifted positions, but since such spring points are well known and understood in the art they have not been illustrated herein. As previously stated the shaft 97 and the spools 100 are power actuated in their indexing movements and the means for accomplishing this actuation will now be set forth.

A motor 160 which is constantly running when the cross slide carriage or cross slide is being used during the operation of the machine is carried by the apron and has a pinion 161 on its spindle which constantly meshes with a gear 162 formed on a sleeve 163 that is freely rotatable on the shaft 97. The sleeve 163 is provided with a ratchet 164 which is located in a bored out opening formed in a member 165 that is freely rotatable on the shaft 97. The member 165 carries a pivotally mounted pawl 166 which is normally urged to ratchet engaging position by the spring 167. The pawl 166 is provided with an arm 168 that projects radially outwardly beyond the circumference of the member 165 and cooperates with the stop portion 136 of the lever arm 134 previously referred to.

It will be seen that when the arm 168 is in engagement with the stop portion 136 of the lever arm 134 the pawl is rocked against the action of the spring 167 and out of ratchet engaging position, wherefore rotation of the ratchet by the motor 160 imparts no rotation to the member 165. The member 165 is provided with a plurality of circumferentially spaced friction shoes 169 which are held by spring pressure in engagement with the flange 129 with sufficient pressure that rotation of the member 165 will rotate the flange 129 and the disks 121 mounted on the sleeve 119. Likewise such rotation similarly rotates the shaft 97 and the spools 100.

However, it will be seen that when any of the lugs 122 abut the abutting arm 126 and positively stop the rotation of the disks 121, shaft 97 and spools 100, the member 165 may continue to rotate through its operative connection with the ratchet 164, there merely being a slippage between the friction shoes 169 and the flange 129.

It will be understood that downward movement of the feed control lever 85 or the feed control lever 86 from the full line position of Fig. 2 and into engagement with the stop surface 142 or 143 shifts the rod 135 toward the left against the action of the spring 137. During the first part of this movement of the rod 135 the sleeve 127 is moved one step toward the right to position the abutting arm 126 in the path of movement of the lug 122 on the next right hand disk 121 through the mechanism previously explained. During the latter portion of the movement of the rod 135 and near the end thereof the stop portion 136 moves out of holding contact with the arm 168 of the pawl 166, whereupon said pawl engages the teeth of the ratchet 164 and the member 165 rotates with said ratchet as a unit, with a resultant rotation of the disks 121, shaft 97 and spools 100. The amplitude of the rotating movement imparted to the disks 121, shaft 97 and spools 100 depends upon the location of the lug 122 in the path of which lies the arm 126, it being understood that the engagement of said arm by said lug arrests further rotation of the disks, shaft and spools, although the member 165 will continue to rotate until the feed control lever 85 is returned to the full line position of Fig. 2 and the holding portion 136 of the lever arm 134 has engaged the arm 168 of the pawl 166 and moved the latter out of engagement with the ratchet 164, it being recalled that the spring 137 will act when the pressure on the feed control lever 85 is released to restore the rod 135 and its associated parts to the position indicated in Fig. 2.

The shaft 129 has fixed to its right hand end and outside of the apron a knob 170 which on its circumference carries indicia indicating the different operative steps of the work cycle and which indicia cooperate with a fixed pointer 171 to indicate to the operator the particular operative step in the cycle at which the machine is functioning.

Although the selecting or preselecting mechanism embodying the invention has been described in detail with reference to the apron of the cross slide carriage and cross slide, it will be understood that that part of said mechanism utilized for the cross slide carriage can be incorporated in the apron 25 of the turret slide in a similar manner and the present invention contemplates so doing. Of course the apron of the turret slide is provided with a single feed control lever 172 which corresponds to the feed control level 85 previously referred to.

It will also be understood that the hand wheel 173 on the apron 25 of the turret slide corresponds to the hand wheel 74 on the apron 28 of the cross slide carriage.

In order to correlate the description heretofore set forth and to fully bring out the utility of the parts described in detail, a résumé of the operation of the machine will now be given. It will be assumed that a work piece is mounted in the chuck of the work spindle 23 and said spindle is rotating at the proper speed for the first operative step in the work cycle and that the control level 30 has been set in the proper position to effect the correct speed of rotation for the shaft 29.

It will also be assumed that it is desired in the first step of the cycle to feed the cross slide carriage longitudinally of the work for a turning cut and that the operator by means of the hand wheels 74 and 27b has manually brought the cutting tool adjacent to the work and in cutting position. It should also be assumed that during the set-up of the machine the disks 121 have been located in their correct positions for controlling the indexing of the spools 100 to produce the changes in the rates of movement of the cross slide carriage and cross slide required for the different operative steps in the complete work cycle which, in the present instance, is assumed to include six operative steps.

Assuming that the parts are in the position indicated in Fig. 2 and that the operator has initiated the operation of the motor 160, he then raises the feed control lever 85 from the full line position to the dash line position, i. e., clutch engaged position. It will be understood that the spools 100 are in the proper indexed position for the first step of the work cycle. The movement of the control lever 85 just referred to shifts the link 102 toward the left with a resultant endwise movement of the spools toward each other and a consequent shifting of one or the other or both of the shifting levers to shift one or the other or both of the sliding keys 35 and 48 to obtain through the gear train the correct rate of feeding movement for the cross slide carriage.

It will also be recalled that the latter part of the movement of the feed control lever 85 from the full line position of Fig. 2 to the dash line position thereof disengages the pawl 107 from the shoulder 106 of the block 105 and brings the shoulder 114 into contact with the arm 104 of the lever 103 and results in rocking said lever in an anticlockwise direction and through the link 102 rocking the lever 101 in a clockwise direction, with a consequent outward endwise movement of the spools 100 away from each other and into a position wherein they may be indexed.

The extreme last part of the movement of the feed control lever 85 into the dash line position of Fig. 2 effects the engagement of the clutch members on the shaft 64, whereupon the cross slide carriage is fed by power at the desired rate of movement for the first operative step of the work cycle. It will be recalled that the feed control lever 85 is held in clutch engaged position by the spring pressed pin and recess previously referred to.

Although the operator might manually disengage the feed control lever 85 at the end of the feeding movement for the first step, said lever would probably be disengaged in the usual way by the engagement of one of the screws 174 of the stop roll 175 with the stop rod 176, see Figs. 1 and 2, as will be well understood in the art. The feed control lever 85 when disengaged falls by gravity and under the additional action of the spring 110 to the full line position of Fig. 2 and the clutch members on the shaft 64 are disconnected from each other during the first part of this downward movement of the feed control lever. The downward movement of the feed control lever 85 allows the spring 110 to restore the pawl 107 to actuating engagement with the surface 106 of the block 105 and also moves the shoulder 114 to the relative position with respect to the arm 104 indicated in Fig. 2. It will be assumed that the tension of the spring 137 is so adjusted as to cushion the downward movement of the feed control lever 85 and bring it to rest in the position indicated in Fig. 2 wherein it lies in engagement with the rounded end of the lever arm 133. The operator may now adjust the position of the tools for a cross cut, for example, by indexing the square turret and shifting the cross slide carriage and the cross slide manually by means of the hand wheels, as is well known in the art.

Now in order to index the spools 100 to the proper position to obtain the required rate of feeding movement of the cross slide for the second operative step of the work cycle the operator manually moves the feed control lever 86 from the full line position of Fig. 2 downwardly into engagement with the stop surface 143. The downward movement of the feed control lever 86 rocks the three arm lever pivoted at 140 and the first part of this rocking movement of the three arm lever rocks the sleeve 147 and flange 146 to rotate the ratchet 150 and the shaft 129 through one-sixth of a complete revolution with a resultant endwise movement of the sleeve 127 toward the right as viewed in Fig. 10 to displace the abutment arm 126 from over the disk 121 for the first step into position over the disk 121 for the second step of the operative cycle, it being recalled that the retaining pawl 151 holds the ratchet 150 in the position to which it has been turned. Also such rotation of the ratchet 150 and shaft 129 effects a partial winding of the rat trap spring 153. At this time the numeral 2 on the knob 170 lies in alignment with the fixed pointer 171 and indicates to the operator that the machine is set for the second operative step of the work cycle.

During the rocking movement of the three armed lever the rod 135 is shifted toward the left against the action of the spring 137 and during this latter part of such shifting movement the stop portion 136 of the lever arm 134 moves out of holding engagement with the arm 168 of the pawl 166 and said pawl engages with a tooth of the rotating ratchet 164, whereupon the member 165, disks 121, shaft 97 and spools 100 rotate in unison with the ratchet until the lug 122 of the second disk 121 engages with the abutment arm 126 and the rotation of the disks, shaft 97 and spools 100 is positively arrested with the spools in the proper indexed position for obtaining later the correct rate of feeding movement for the second operative step. At this time the member 165 will continue to rotate with the ratchet 164 until the arm 168 of the pawl 166 again contacts the portion 136 of the lever arm 134 and is rocked out of engagement with the ratchet. The length of time elapsing between the indexing of the spools and the engagement of the arm 168 of the pawl 166 with the portion 136 of the lever arm 134 depends upon the time that the operator holds the feed control lever 86 in engagement with the stop 143. If the operator only engages the lever 86 with the stop 143 momentarily then the member 165 will make only a single revolution, but if he should hold the lever 86 against the stop 143 a greater length of time the member 165 may make several revolutions before the pawl 166 is disengaged.

As soon as the operator releases the downward pressure on the feed control lever 86 the spring 137 will shift the rod 135 toward the right until the slotted portion of the rod 135 which receives the end of the lever arm 139 abuts the bracket 98, at which time the three armed lever is restored to the position indicated in Fig. 2, as will also be the two armed lever pivoted at 132 to position the stop portion 136 thereof in holding engagement with the arm 168 of the pawl 166. The restoring movement of the rod 135 and the three armed lever as just referred to causes the actuating pawl 148 on the flange 146 to idle over the ratchet 150 until it is in engagement with the next tooth of the ratchet.

When the operator now desires to feed the cross slide at the rate required for the second operative step of the work cycle he manually raises the feed control lever 86 from the full line position of Fig. 2 into the dash line or clutch engaged position thereof to engage the clutch on the shaft 78. The first part of this movement results in the arm 115 of the feed control lever through its engagement with the shoulder 113 rocking the member 108 in a clockwise direction to first shift the link 102 toward the left through the pawl 107, rock the lever arms 101 and 103 to bring the spools inwardly toward each other and effect a shifting of one or more of the shifting levers and the sliding keys 35 and 48 to obtain the desired and preselected gear ratio for the feed in the gear train. The latter part of the movement of the feed control lever 86 toward clutch engaged position effects engagement of the shoulder 114 with the arm 104 to rock the lever arm 103 in an anticlockwise direction, move the link 102 toward the right and rock the lever arm 101 in a clockwise direction, with a resultant outward movement of the spools 100 to separated position wherein they may be indexed. This clockwise movement of the member 108 simultaneously with the anticlockwise rocking of the lever arm 103 brings the arm 116 of the pawl 107 into engagement with the screw 117 and rocks said pawl to disengage the same from the surface 106 of the block 105, thus freeing the link 102 for movement toward the right. At the end of the movement of the feed control lever 86 to the dash line position shown in Fig. 2 the clutch members on the shaft 78 are engaged and the power feed to the cross slide commences at the correct rate of movement for the second operative step of the work cycle. When the feeding movement of the cross slide for the second operative step has been completed the feed control lever 86 is manually or automatically disengaged, as well known in the art, to disengage the feed clutch and moves from the dash line position of Fig. 2 to the full line position thereof, while the various operative parts are restored to the positions indicated thereon.

Assuming that it is desired during the third operative step of the work cycle to take a finished turning cut on the work piece, the operator may index the turret on the cross slide and then by means of the hand wheels 27b and 74 manually moves the cross slide 27 and the cross slide carriage 26 to position the tool adjacent to the work piece. The operator may then manipulate the feed control lever 85 in the manner described for the first operative step of the work cycle to cause the tool to feed along the work and perform the finished turning cut. After the finished turning cut has been completed the feed control lever 85 will be automatically disengaged as has been previously explained in connection with the first operative step. It will be understood that the manipulation of the feed control lever 85 as just referred to results in the functioning of the parts in the manner described with respect to the first operative step, it being borne in mind that the indexing of the spools 100 for the third operative step is in correlation to the feeding rate desired during said step.

Merely by way of example it may be assumed that the cross slide is power fed during the fourth operative step of the work cycle in the same way as described for the second operative step and wherein the cutting tool will produce a finishing cross cut on the work piece. Similarly, the fifth and sixth steps of the operative cycle may include, respectively, power feeding of the cross slide carriage and power feeding of the cross slide to perform certain additional cutting operations on the work piece and which feeding movements are obtained in the manner explained for the first and second operative steps.

As explained, the sleeve 127 is given a step by step movement toward the right for each operative step in the work cycle a distance equivalent to the thickness of each disk 121. This step by step movement of the sleeve 127 causes the arm 130 to move step by step toward the right as the different operative steps of the work cycle occur, until said arm has moved from contact with the fixed collar 155 on the rod 135 into contact with the adjustable collar 157, that is, has moved from the position shown in Fig. 10 to the position shown in Fig. 11, it being recalled that in the present illustration the work cycle is presumed to have six operative steps.

Upon the completion of the sixth or last operative step in the work cycle, either the feed control lever 85 or the feed control lever 86, depending upon whether the cross slide carriage or the cross slide was power fed during the sixth step, will be disengaged either manually or automatically and move from the dash line position of Fig. 2 to the full line position thereof.

When the finished work piece has been removed and a new and similar work piece positioned in the chuck of the work spindle 23 and the operator desires to initiate a new work cycle, he depresses the feed control lever 85 from the full line position of Fig. 2 into engagement with the stop surface 142 and such movement of the feed control lever shifts the rod 135 toward the left against the action of the spring 137 and rocks the three armed lever pivoted at 140. During the first part of the rocking movement of the three armed lever the ratchet 150 is moved in an anticlockwise direction by the pawl 148, with a resultant turning of the shaft 129 and movement toward the right of the sleeve 127 as if the latter were moving into a seventh position. Since the arm 130 at the end of the sixth operative step was in contact with the adjustable collar 157 it will be seen that this movement of the sleeve 127 causes said arm 130 to impart movement to the rod 131 through the collar 157 and to shift the releasing cone 159 toward the right, with the result that the pawls 148 and 151 are both rocked out of engagement with the teeth of the ratchet 150, whereupon the rat trap spring 153 comes into action and rotates the shaft 129 in a reverse or clockwise direction, as viewed in Fig. 12, and causes the sleeve 127 and its arms 126 and 130 to move from the position shown in Fig. 11 toward the left and into the position shown in Fig. 10. Just prior to the sleeve 127 reaching the position shown in Fig. 10, the arm 130 thereof engages the fixed collar 155 and shifts the rod 131 toward the left, thus shifting the cone 159 out of engagement with the pawls 148 and 151, which again engage the teeth of the ratchet 150. At this time the abutment arm 126 will lie in the path of movement of the lug 122 on the first disk 121. The functioning of the parts as just referred to occurs during the first part of the rocking movement of the three armed lever. The latter part of the shifting movement of the rod 135 and the rocking movement of the three armed lever moves the stop portion 136 of the lever arm 134 out of holding contact with the arm 168 of the pawl 166, which latter then engages with a tooth of the rotating ratchet 164, whereupon the member 165, disks 121, shaft 97 and spools 100 rotate as a unit until the lug 122 of the first disk 121 strikes the abutment arm 126 and the rotating movement of the disks, shaft 97 and spools 100 is positively arrested with the spools in the proper indexed position for the first operative step.

When the operator releases the feed control lever 85 from its depressed position and the latter returns to the full line position of Fig. 2, the parts are restored to the position indicated in Fig. 2, at which time the holding portion 136 of the lever arm 134 has again engaged the arm 168 of the pawl 166 and rocked the latter out of engagement with the teeth of the ratchet 164 and the member 165 comes to rest. The operator may now start the machining of the second work piece in the first operative step of the work cycle in the manner previously explained.

The operation has been described on the basis of six operative steps in the work cycle. However, in the event there are fewer operative steps the adjustable collar 157 is adjusted to position over the proper depression 156 and then on completion of the cycle the arm 130 engages the collar 157 to shift the same toward the right to restore the parts in the same way.

The résumé of the operation of the machine has assumed that the tension of the spring 137 is sufficiently great to arrest the movement of the feed control levers 85 and 86 in the full line position of Fig. 2 and to require the operator to manually depress said levers into engagement with the stop surfaces 142 and 143 in order to effect indexing of the spools 100. However, the character of the machining cuts on the work piece and the nature of the latter may be such that the indexing of the spools can be advantageously effected automatically upon each disengagement of either of the feed control levers without requiring any manual depression of said levers by the operator, as, for instance, when no further or second feeding movement at the old rate is required after the feed control lever has been disengaged once in the same operative step. In such a case the tension of the spring 137 may be sufficiently reduced by adjusting the screw 138 so that when the feed control lever 85 or 86 is disengaged and moved downwardly by gravity into contact with the end of the lever arm 133 or 141 the lever pivoted at 132 or 140 will be rocked by the weight of the feed control lever and the action of the spring 110 and until said lever contacts the stop surface 142 or 143. It will be understood that in this case the rod 135 is shifted by the rocking levers and the parts will function in the same way as though the feed control levers had been manually depressed as previously explained with a resultant indexing of the spools 100. In this instance, however, as long as the feed control levers both remain in their lowermost position the stop portion 136 of the lever arm 134 will continue to be disengaged from the arm 168 of the pawl 166 and the member 165 will continue to rotate with the ratchet 164 until one or the other of the feed control levers is moved by the operator into clutch engaged position. This is due to the fact that the spring 137 is adjusted in excess of the weight of either feed control lever alone, so that when one such lever is raised to clutch engaged position the other feed control lever is raised by the spring 137 substantially to the full line position of Fig. 2 and one wherein the actuating pawl 148 is positioned to function again.

Figure 15:
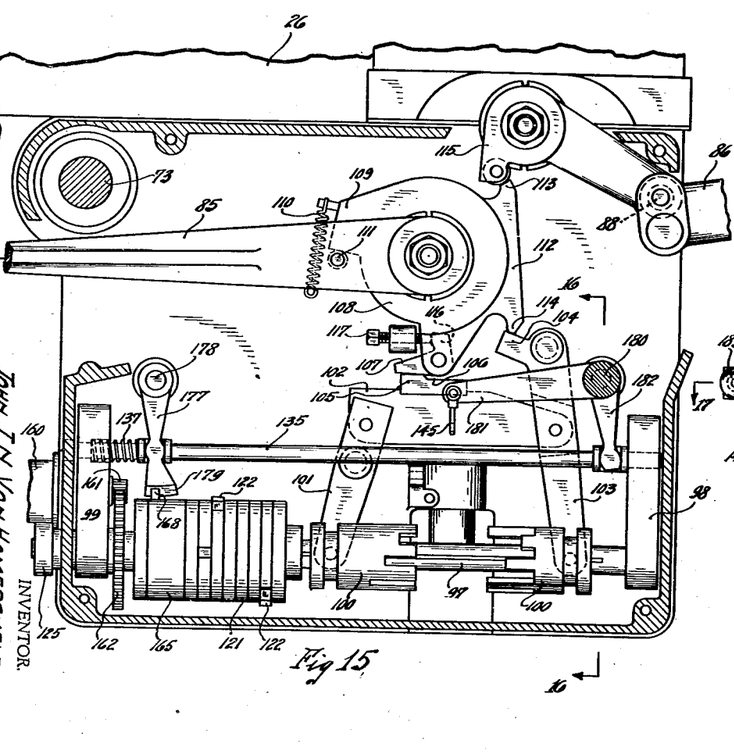
Fig. 15 is a sectional view similar to Fig. 2 but illustrating a modified form of the invention over that shown in Fig. 2.
Figure 16:
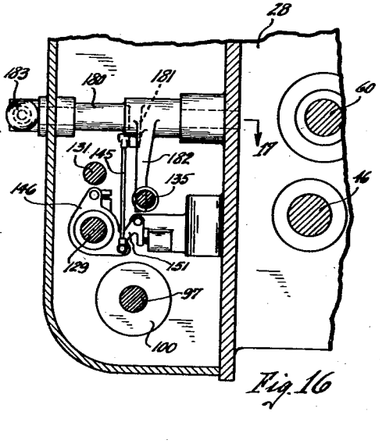
Fig. 16 is a fragmentary sectional view taken substantially along line 16—16 of Fig. 15, looking in the direction of the arrows.
Figure 17:
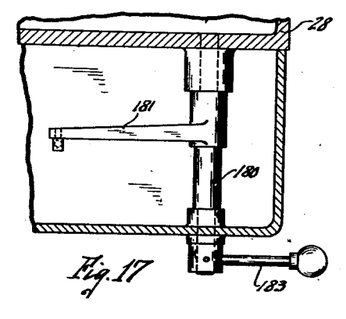
Fig. 17 is a sectional view taken substantially along line 17—17 of Fig. 16, looking in the direction of the arrows.

In Figs. 15 to 17 inclusive a slightly different form of mechanism embodying the invention is illustrated. In this modified form the feed control levers for the cross slide carriage and the cross slide do not effect the indexing of the spools and the latter function is obtained by means of an independent rockable trip handle located at the front of the apron and accessible to the operator. Insofar as the parts of the modified form of mechanism are identical with the parts of the previously described form the same reference characters are utilized to designate such parts and the detailed description thereof is not repeated.

In the modified form a single armed lever 177 pivoted at 178 is utilized in place of the lever of the previously described form that is pivoted at 132 and includes the arms 133 and 134. The single armed lever 177 is provided at its lower end with a holding portion 179 corresponding to the holding portion 136 at the lower end of the lever arm 134. In the modified construction in place of the three armed lever pivoted at 140 a two armed lever is employed and which is pivoted at 180 and comprises the arm 181 corresponding to the arm 144 of the three armed lever and the arm 182 which corresponds to the arm 139 of said three armed lever.

The pivot 180 for the two armed lever just referred to is in the form of a rockable shaft which extends outwardly of the front side of the cover of the apron and has fixed to its outer end an operating trip handle 183. It will be seen that when the trip handle 183 is rocked to rock the two armed lever, the rod 135 is shifted endwise similar to the manner in which it was shifted when the feed control lever 85 or 86 was moved into engagement with the stop surface 142 or 143 in the previously described form. Consequently the operating trip handle 183 forms an independent control or means for effecting the power indexing of the spools 100. In the modified form as in the previously described form the raising of the feed control levers to clutch engaged position effects the inward and outward endwise movement of the spools and the obtainance of the selected or preselected changes in rates of movement.

Although several embodiments of the invention have been illustrated and described herein it will be understood that the invention is susceptible of such modifications and adaptations as come within the scope of the appended claims.

Having thus described my invention, I claim:

1. In a machine tool, a movable part, a change speed transmission for imparting different rates of feeding movement to said part and movable bodily therewith, means operatively associated with said transmission and indexible to select or preselect the different rates of movement for said part and actuatable to obtain the selected or preselected rates of movement, power operated means for indexing said last means and movable with said part, and control means for said power operated means and movable with said part, said control means being operatively connected with said first named means for actuating the same.

2. In a machine tool, a plurality of movable parts, a change speed transmission for imparting different rates of feeding movements to said parts and movable bodily with one of said parts, means operatively associated with said transmission and indexible to select or preselect the different rates of movements for said parts and actuatable to obtain the selected or preselected rates of movement, power operated means for indexing said last means and movable with said one part, and control means for said power operated means and movable with said one part, said control means being operatively connected with said first named means for actuating the same.

3. In a machine tool, a movable part, a change speed transmission for imparting different rates of feeding movement to said part and movable bodily therewith, means operatively associated with said transmission and movable with said part and indexible to select or preselect the different rates of movement for said part, a motor movable with said part, means for connecting momentarily said motor and said first named means for indexing the latter, and control means for said second named means and movable with said part.

4. In a machine tool, a slide provided with an apron, a change speed transmission in said apron for imparting different rates of movement to said slide, means carried by said apron and operatively associated with said transmission and indexible to select or preselect the different rates of movement for said slide and actuatable to obtain said selected or preselected rates of movement, power operated means carried by said apron for indexing said last named means, and control means for said power operated means and carried by said apron, said control means being operatively connected with said first named means to actuate the same.

5. In a machine tool, a cross slide carriage provided with an apron, a cross slide on said carriage, a change speed transmission carried by said apron for imparting different rates of feeding movement to said carriage and said cross slide, means carried by said apron and operatively associated with said transmission and indexible to select or preselect the different rates of movement for said carriage and said cross slide and actuatable to obtain said selected or preselected rates of movement, power operated means carried by said apron for indexing said last means, and control means for said power operated means and carried by said apron, said control means being operatively connected with said first named means to actuate the same.

6. In a machine tool, a movable part, a change speed transmission for imparting different rates of feeding movement to said part and movable bodily therewith, a power source, clutch means for effecting driving relationship between said power source, transmission and part, means operatively associated with said transmission and indexible to select or preselect the different rates of movement for said part and movable with the latter, power operated means for indexing said last means, control means movable with said part, and operative connections between said control means, said clutch means, and said power operated means whereby said control means controls the two latter means.

7. In a machine tool, a plurality of movable parts, a change speed transmission for imparting different rates of feeding movements to said parts and movable bodily with one of said parts, a power source, clutch means for effecting driving relationship between said power source, transmission and each of said parts, means operatively associated with said transmission and indexible to select or preselect the different rates of movement for said parts and movable with said one part, power operated means for indexing said last means, control means movable with said one part, and operative connections between said control means, said clutch means and said power operated means whereby said control means controls the two latter means.

8. In a machine tool, a movable part, a change speed transmission for imparting different rates of movement to said part, a power source, clutch means for effecting driving relationship between said power source, transmission and part, means operatively associated with said transmission and indexible to select or preselect the different rates of movement for said part, power operated means for indexing said last means, and a control lever movable in a single plane, and operative connections between said control lever, said clutch means and said power operated means whereby movement of said lever in said single plane controls the two latter means.

9. In a machine tool, a plurality of movable parts, a change speed transmission for imparting different rates of movements to said parts, a power source, clutch means for effecting driving relationship between said power source, transmission and each of said parts, means operatively associated with said transmission and indexible to select or preselect the different rates of movements for said parts, power operated means for indexing said last means, and control levers each movable in a single plane, and operative connections between said control levers, said clutch means and said power operated means whereby movement of any one of said levers in its respective single plane controls the two latter means.

10. In a machine tool, a movable part, a change speed transmission for imparting different rates of movement to said part, a power source, clutch means for effecting driving relationship between said power source, transmission and part, means operatively associated with said transmission and indexible to select or preselect the different rates of movement for said part, power operated means for indexing said last means, a control lever operatively associated with said clutch means for engaging and disengaging the same, and operative connections between said lever and said power operated means such that a continuation of the movement of said lever from clutch disengaged position and in the same direction initiates operation of said power operated means.

11. In a machine tool, a plurality of movable parts, a change speed transmission for imparting different rates of movements to said parts, a power source, clutch means for effecting driving relationship between said power source, transmission and any of said parts, means operatively associated with said transmission and indexible to select or preselect the different rates of movements for said parts, power operated means for indexing said last means, a plurality of control levers operatively associated with said clutch means for engaging and disengaging the same, and operative connections between said levers and said power operated means such that a continuation of the movement of any one of said levers from clutch disengaged position and in the same direction initiates operation of said power operated means.

12. In a machine tool, a movable part, a change speed transmission for imparting different rates of movement to said part, a power source, clutch means for effecting driving relationship between said power source, transmission and part, means operatively associated with said transmission and indexible to select or preselect the different rates of movement for said part and movable to obtain the selected or preselected rates of movement, power operated means for indexing said last means, a control lever operatively associated with said clutch means and movable to engage and disengage the same, operative connections between said lever and said power operated means such that a continuation of the movement of said lever in a clutch disengaging direction initiates operation of said power operated means, and operative connections between said lever and said second named means such that movement of said lever in a clutch engaging direction effects movement of said second named means to obtain the selected or preselected rate of movement.

13. In a machine tool, a plurality of movable parts, a change speed transmission for imparting different rates of movements to said parts, a power source, clutch means for effecting driving relationship between said power source, transmission and each of said parts, means operatively associated with said transmission and indexible to select or preselect the different rates of movement for said parts and movable to obtain the selected or preselected rates of movements, power operated means for indexing said last means, a plurality of control levers operatively associated with said clutch means and movable to engage and disengage the same, operative connections between said levers and said power operated means such that a continuation of the movement of any one of said levers in a clutch disengaging direction initiates operation of said power operated means, and operative connections between said levers and said second named means such that movement of any one of said levers in a clutch engaging direction effects movement of said second named means to obtain the selected or preselected rate of movement.

14. In a machine tool, a movable part, a change speed transmission for imparting different rates of movement to said part, a power source, clutch means for effecting a driving relationship between said power source, transmission and part, means operatively associated with said transmission and indexible to select or preselect the different rates of movement for said part and actuatable to obtain the selected or preselected rates of movement, power operated means for indexing said last means, a control lever movable only in a single plane, and operative connections between said control lever, said clutch means, said power operated means and said second named means, such that movement of said lever in one direction disengages said clutch means and initiates operation of said power operated means while movement of said lever in the opposite direction actuates said second named means and engages said clutch means.

15. In a machine tool, a plurality of movable parts, a change speed transmission for imparting different rates of movements to said parts, a power source, clutch means for effecting a driving relationship between said power source, transmission and any of said parts, means operatively associated with said transmission and indexible to select or preselect the different rates of movements for said parts and actuatable to obtain the selected or preselected rates of movement, power operated means for indexing said last means, a plurality of control levers each movable only in a single plane, and operative connections between said control levers, said clutch means, said power operated means and said second named means such that movement of any one of said levers in one direction disengages said clutch means and initiates operation of said power operated means while movement of any one of said levers in the opposite direction actuates said second named means and engages said clutch means.

16. In a machine tool, a movable part, a change speed transmission for imparting different rates of feeding movement to said part and movable bodily therewith, a power source, clutch means for effecting driving relationship between said power source, transmission and part, means operatively associated with said transmission and indexible to select or preselect the different rates of movement for said part and actuatable to obtain the selected or preselected rate of movement, said last mentioned means being movable with said part, power operated means for indexing said last mentioned means, a control lever movable with said part, and operative connections between said control lever, said clutch means, said second mentioned means and said power operated means whereby said lever controls said clutch, said power operated means and the actuation of said second mentioned means.

17. In a machine tool, a slide having an apron, a change speed transmission for imparting different rates of movement to said slide and carried by said apron, a power source, clutch means for effecting driving relationship between said power source, transmission and slide, means carried by said apron and operatively associated with said transmission and indexible to select or preselect the different rates of feeding movement for said slide and actuatable to obtain said selected or preselected rates, power operated means for indexing said last means, a control lever carried by said apron, and operative connections between said lever, said clutch means, said power operated means and said second named means such that movement of said lever controls said clutch means, said power operated means and the actuation of said second named means.

18. In a machine tool, a slide provided with an apron, a second slide movable on said first named slide, a change speed transmission carried by said apron and operable to impart different rates of feeding movement to said slides, a power source, separate clutch means for selectively effecting driving relationship between said power source, transmission and each of said slides, means carried by said apron and operatively associated with said transmission and indexible to select or preselect the different rates of feeding movements for said slides and actuatable to obtain said selected or preselected rates, power operated means for indexing said last means, separate control members operatively associated with said clutches for engaging and disengaging the same, and operative connections between said members, said power operated means and said second named means such that each of said members controls said power operated means and the actuation of said second named means.

19. In a machine tool, a slide having an apron, a second slide movable on said first named slide, a change speed transmission carried by said apron for imparting different rates of feeding movements to said slides, a power source, separate clutch means for effecting driving relation between said power source, transmission and either of said slides, means operatively associated with said transmission and indexible to select or preselect the different rates of movement for either of said slides and carried by said apron, power operated means for indexing said last means, separate control members for said clutch means and carried by said apron, and operative connections between said control members and said power operated means such that said members each controls the operation of said power operated means.

20. In a machine tool a slide having an apron, a second slide movable on said first named slide, means in said apron for imparting different rates of feeding movements to either of said slides, means in said apron and operatively associated with said first means and indexible to select or preselect the different rates of feeding movement for either of said slides, separate control members operatively associated with said first means for selectively effecting feeding movement of either of said slides, and operative connections between said members and said second means for effecting indexing movements thereof.

21. In a machine tool, a movable part, a change speed transmission for imparting different rates of movement to said part, a power source, clutch means for effecting a driving relationship between said power source, transmission and part, mechanism operatively associated with said transmission and indexible to select or preselect the different rates of movement for said part and actuatable to obtain the selected or preselected rates of movement, power operated means for indexing said mechanism, a control lever movable only in a single plane, and operative connections between said control lever, said clutch means, said mechanism and said power operated means such that movement of said lever in one direction disengages said clutch means and initiates operation of said power operated means to index said mechanism, while movement of said lever in the opposite direction effects restoration of said power operated means to its former condition, actuates said mechanism and engages said clutch means.

22. In a machine tool, a movable part, a change speed transmission for imparting different rates of movement to said part, a power source, clutch means for effecting driving relationship between said power source, transmission and part, mechanism operatively associated with said transmission and indexible to select or preselect the different rates of movement for said part, power operated means for indexing said mechanism, a control lever operatively associated with said clutch, means for engaging and disengaging the same, and operative connections between said lever and said power operated means such that a continuation of the movement of said lever from said clutch disengaged position and in the same direction initiates operation of said power operated means, said operative connections including pressure means for resisting said continuation of the movement of said lever from clutch disengaged position.

23. A machine tool as defined in claim 22 and wherein means is provided for adjusting the pressure of said pressure means.

24. In a machine tool, a movable part, a change speed transmission for imparting different rates of feeding movement to said part and movable bodily therewith, means operatively associated with said transmission and indexible to select or preselect the different rates of movement for said part and actuatable to obtain the selected or preselected rates of movement, power operated means for indexing said last means and movable with said part, a control means movable with said part, and operative connections between said control means, said power operated means and said first named means such that predetermined movement of said control means causes said power operated means to index said first named means and then effects an actuation of said first named means.

25. In a machine tool, a movable part, a change speed transmission for imparting different rates of feeding movement to said part and movable bodily therewith, a power source, clutch means for effecting driving relationship between said power source, transmission and part, means operatively associated with said transmission and indexible to select or preselect the different rates of movement for said part and movable with the latter, power operated means for indexing said last means, a control means, and operative connections between said control means, said clutch means and said power operated means whereby said control means controls the two latter means.

26. In a machine tool, a movable part, a change speed transmission for imparting different rates of feeding movement to said part and movable bodily therewith, a power source, clutch means for effecting driving relationship between said power source, transmission and part, means movable with said part and operatively associated with said transmission and indexible to select or preselect the different rates of movement for said part and actuatable to obtain the selected or preselected rates of movement, power operated means for indexing said last means, control means, and operative connections between said control means, said clutch means, said second named means and said power operated means such that movement of said control means in one direction disengages said clutch means and initiates operation of said power operated means to index said second named means while movement of said control means in another direction terminates the operation of said power operated means, actuates said second named means to obtain the selected or preselected rate of movement, restores said second named means to indexing position and engages said clutch means.

27. In a machine tool, a plurality of movable parts, a change speed transmission for imparting different rates of movement to said parts, a power source for driving said transmission, means carried by one of said parts and operatively associated with said transmission and indexible to select or preselect the different rates of movement for said parts and actuatable to obtain the selected or preselected rates of movement, power operated means carried by said one part for indexing said last named means, control levers carried by said one part, and operative connections between said control levers, said first named means and said power operated means such that movement of any one of said levers actuates said first named means and controls said power operated means.

28. In a machine tool, a movable part, a change speed transmission for imparting different rates of feeding movement to said part and movable bodily therewith, means operatively associated with said transmission and indexible to select or preselect the different rates of movement for said part, power operated means for indexing said last named means and movable with said part and including a power source, a plurality of adjustable elements each provided with locating means, means for securing said elements together as a unit in adjusted position, and means for operatively connecting and disconnecting said power source and said elements and including a friction drive therebetween, and control means for said power operated means carried by said movable part and including an abutment movable step by step in relation to the different operative steps of a work cycle and into the path of movement of the locating means of said elements to position the latter in relation to different rates of movement for said part.

29. In a machine tool, a movable part, a change speed transmission for imparting different rates of feeding movement to said part and movable bodily therewith, means operatively associated with said transmission and indexible to select or preselect the different rates of movement for said part, power operated means for indexing said last means and movable with said part, and control means for said power operated means and movable with said part and including a control member, an element movable step by step in relation to the different operative steps of a work cycle, adjustable locating members cooperating with said element, and operative connections between said control member and said element for effecting the step by step movement of the latter to bring it into cooperating relationship successively with each adjustable locating member.

JOHN J. N. VAN HAMERSVELD.